(12) United States Patent
Shi et al.

(10) Patent No.: US 9,652,215 B2
(45) Date of Patent: May 16, 2017

(54) APPLICATION INSTALLATION/UNINSTALLATION ACROSS MULTIPLE SYSTEMS

(71) Applicant: Microsoft Technology Licensing, LLC, Redmond, WA (US)

(72) Inventors: Xiaolong Shi, Beijing (CN); Song Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/607,849

(22) Filed: Jan. 28, 2015

(65) Prior Publication Data

US 2016/0188312 A1 Jun. 30, 2016

(51) Int. Cl.
  *G06F 9/455* (2006.01)
  *G06F 9/445* (2006.01)
  *H04L 29/08* (2006.01)

(52) U.S. Cl.
  CPC ............ *G06F 8/62* (2013.01); *G06F 8/61* (2013.01); *H04L 67/10* (2013.01)

(58) Field of Classification Search
  None
  See application file for complete search history.

(56) References Cited

U.S. PATENT DOCUMENTS

| | | | |
|---|---|---|---|
| 5,361,358 A * | 11/1994 | Cox | G06F 8/61 713/1 |
| 6,330,669 B1 | 12/2001 | Mckeeth | |
| 7,107,330 B1 * | 9/2006 | Hamilton, II | G06F 8/61 709/219 |
| 7,581,229 B2 | 8/2009 | Watkins et al. | |
| 7,950,008 B2 * | 5/2011 | Bhide | G06F 8/61 717/174 |
| 8,024,742 B2 | 9/2011 | Lescouet et al. | |
| 8,090,938 B2 | 1/2012 | Xu | |
| 8,312,477 B2 | 11/2012 | Lin | |
| 8,365,164 B1 * | 1/2013 | Morgenstern | G06F 8/61 717/108 |
| 2003/0154337 A1 | 8/2003 | Ohno et al. | |
| 2004/0237086 A1 | 11/2004 | Sekiguchi et al. | |
| 2004/0243997 A1 * | 12/2004 | Mullen | G06F 8/60 717/174 |

(Continued)

FOREIGN PATENT DOCUMENTS

EP 2515231 A1 10/2012

OTHER PUBLICATIONS

Kim, et al., "Fast Operating System Switcher for Mobile CE Devices", In Proceedings of IEEE International Conference on, Consumer Electronics, Jan. 11, 2013, 2 pages.

(Continued)

*Primary Examiner* — Isaac T Tecklu

(57) ABSTRACT

The subject matter described herein relates to application installation/uninstallation across multiple systems. Responsive to installation or uninstallation of an application on a first system running on a device, it is determined whether the application is to be installed or uninstalled on a second system. Responsive to determining that the application is to be installed or uninstalled on the second system, an indication is set while the first system is running, where the indication causes installation or uninstallation of the application on the second system.

20 Claims, 4 Drawing Sheets

(56) References Cited

U.S. PATENT DOCUMENTS

| | | | |
|---|---|---|---|
| 2005/0235278 A1* | 10/2005 | Wu | G06F 9/441 717/168 |
| 2007/0011672 A1* | 1/2007 | Bhide | G06F 8/61 717/174 |
| 2007/0240153 A1* | 10/2007 | Cromer | G06F 8/61 717/174 |
| 2008/0120613 A1* | 5/2008 | Dandekar | G06F 9/441 717/175 |
| 2008/0189699 A1* | 8/2008 | Chang | G06F 9/4401 717/177 |
| 2008/0201694 A1* | 8/2008 | Goldberg | G06F 8/62 717/120 |
| 2009/0070757 A1* | 3/2009 | Bak | G06F 8/60 717/177 |
| 2009/0089569 A1 | 4/2009 | Baribault et al. | |
| 2010/0293541 A1* | 11/2010 | Pall | G06F 8/61 717/178 |
| 2012/0084480 A1 | 4/2012 | Reeves et al. | |
| 2012/0084792 A1 | 4/2012 | Benedek et al. | |
| 2012/0266157 A1* | 10/2012 | Mun | G06F 8/61 717/174 |
| 2013/0283259 A1* | 10/2013 | Ellis | G06F 8/61 717/174 |
| 2014/0082608 A1* | 3/2014 | Hayami | G06F 13/12 717/175 |
| 2014/0282058 A1* | 9/2014 | Hui | G06F 3/0487 715/744 |
| 2014/0298316 A1* | 10/2014 | Mao | G06F 8/61 717/174 |
| 2014/0379567 A1* | 12/2014 | Schentrup | G06Q 30/04 705/39 |
| 2015/0026663 A1* | 1/2015 | Williams | G06F 8/71 717/121 |
| 2015/0277933 A1* | 10/2015 | Hsieh | G06F 8/61 713/1 |

OTHER PUBLICATIONS

Sun, et al., "Supporting Multiple OSes with OS Switching", In USENIX Annual Technical Conference on Proceedings of the USENIX Annual Technical Conference, Article No. 28, Jun. 17, 2007, 6 pages.

Carnoy, David, "Do 'multi-OS' smartphones have a future?", Published on: Oct. 7, 2010, Available at: http://www.cnet.com/news/do-multi-os-smartphones-have-a-future/.

"International Search Report and Written Opinion Issued in PCT Application No. PCT/US2015/067972", Mailed Date: Mar. 21, 2016, 13 Pages.

"Second Written Opinion Issued in PCT Application No. PCT/US2015/067972", Mailed Date: Jul. 18, 2016, 8 Pages.

"International Preliminary Report on Patentability Issued in PCT Application No. PCT/US2015/067972", Mailed Date: Oct. 21, 2016, 9 Pages.

* cited by examiner

APPLICATION INSTALLATION/UNINSTALLATION ACROSS MULTIPLE SYSTEMS

RELATED APPLICATIONS

This application claims priority to International Application No. PCT/CN2014/095508, filed on Dec. 30, 2014, and entitled "APPLICATION INSTALLATION/UNINSTALLATION ACROSS MULTIPLE SYSTEMS." This application claims the benefit of the above-identified application, and the disclosure of the above-identified application is hereby incorporated by reference in its entirety as if set forth herein in full.

BACKGROUND

In an electronic device, it is usually required to install and/or uninstall a variety of applications. As known, electronic devices provided by different manufacturers may run different operating systems. Accordingly, software developers may develop a plurality of installation programs of an application, each installation program being specific to a respective operating system, such that the application is properly installed on a target device.

Some electronic devices may include more than one operating system, thus allowing them to operate in a multiple operating system environment. Multiple operating systems may be physically installed at the same time on the electronic device; or only some of the operating systems are physically installed, and others are provided by virtual machines deployed on the device. As used herein, a system running on an electronic device may refer to a real operating system (OS) which is physically installed on the device, or a virtual operating system running on a virtual machine on the device.

SUMMARY

At present, in an electronic device having a plurality of systems (for example, OSs), the user has to download, buy or otherwise obtain different installation programs for a single application, such that the application can be installed and used on different systems. This cumbersome and time consuming process increases the burden of the end user.

In accordance with embodiments of the subject matter described herein, in a device having at least two systems, when an application is installed or uninstalled on one system running on the device, it may be determined whether the application is to be installed or uninstalled on a second system. In one embodiment, an indication may be set while the first system is running, the indication causing installation or uninstallation of the application on the second system. While the second system is running, if the indication indicates that the application is to be installed or uninstalled on the second system, the installation or uninstallation of the application may be initiated on the second system. In this way, the installation or uninstallation of the application may be conveniently completed in an environment with multiple operating systems, without any further manual instructions given by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." The terms "first," "second," "third" and the like may be used to refer to different or same objects. Other definitions, explicit and implicit, may be included below.

Figure 1:
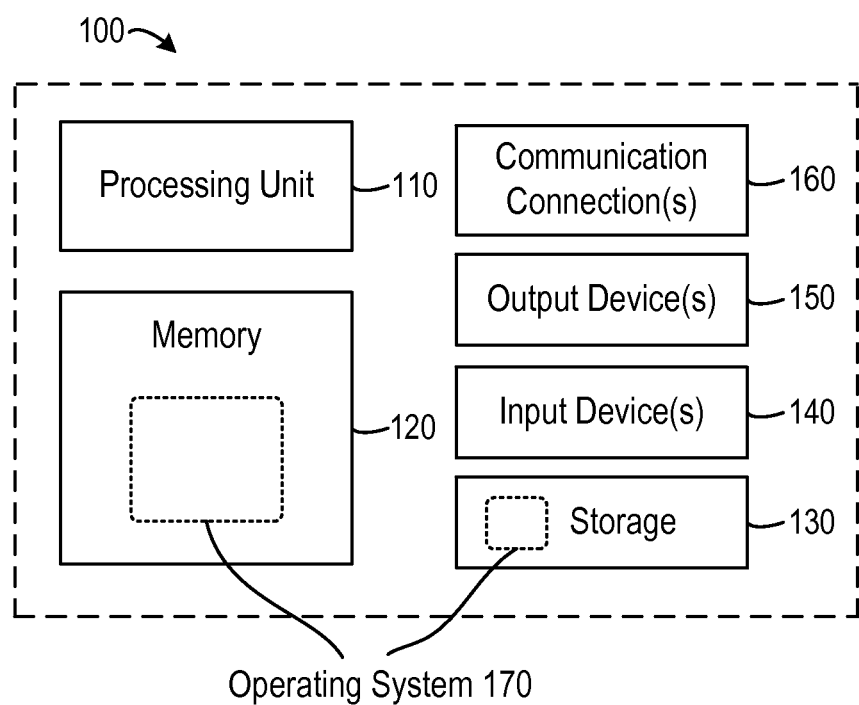
FIG. 1 illustrates an example of an electronic device in which one or more embodiments of the subject matter described herein may be implemented.

FIG. 1 illustrates an example of an electronic device 100 in which one or more embodiments of the subject matter described herein may be implemented. The electronic device 100 is not intended to suggest any limitation as to scope of use or functionality of the subject matter described herein, as various embodiments may be implemented in diverse general-purpose or special-purpose electronic devices. Examples of the electronic device 100 include, but are not limited to, a server, a desktop computer, a laptop computer, a tablet, a smartphone, a mobile phone, a Personal Digital Assistant (PDA) and the like.

With reference to FIG. 1, the electronic device 100 includes at least one processing unit (or processor) 110 and one or more memories 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two.

The memory 120 stores at least a part of an operating system 170. As used herein, the term "operating system" refers to computer program for manipulating and controlling hardware and software resources of a machine. Generally, the operating system is base system software directly running on the machine, and applications need to be implemented separately under each operating system. According to embodiments of the subject matter described herein, the operating system 170 may provide an operating environment for other software executing in the electronic device 100, and coordinates activities of the components of the electronic device 100. By way of example, and not limitation, the operating system 170 may include any operating system for various electronic devices, such as Microsoft Windows, Unix, Linux, Windows Phone, Symbian, and the like.

In one embodiment, one or more virtual machines may be deployed in the electronic device 100, each virtual machine hosting a respective operating system 170. As a result, the operating system 170 may include a real operation system running on an electronic device, and a virtual operating system running on a virtual machine. Additionally, the operating system 170 may also include a hypervisor of many virtual machines. As used herein, the term "hypervisor" refers to a program or software that manages virtual operating systems on virtual machines.

The electronic device 100 may have additional components or features. In the example shown in FIG. 1, the electronic device 100 includes storage 130, one or more input devices 140, one or more output devices 150, and one or more communication connections 160. An interconnection mechanism (not shown) such as a bus, controller, or network interconnects the components of the electronic device 100.

The storage 130 may be removable or non-removable, and may include computer-readable storage media such as flash drives, magnetic disks, magnetic tapes or cassettes, CD-ROMs, CD-RWs, DVDs, or any other medium which can be used to store information and which can be accessed within the electronic device 100. The storage 130 may store at least a part of the operating system 170.

The input device(s) 140 may be one or more of various different input devices. For example, the input device(s) 140 may include a user device such as a mouse, keyboard, trackball, etc. The input device(s) 140 may implement one or more natural user interface techniques, such as speech recognition, touch and stylus recognition, recognition of gestures in contact with the input device(s) 140 and adjacent to the input device(s) 140, recognition of air gestures, head and eye tracking, voice and speech recognition, sensing user brain activity, and machine intelligence. As other examples, the input device(s) 140 may include a scanning device; a network adapter; a CD/DVD reader; or another device that provides input to the electronic device 100. The output device(s) 150 may be a display, printer, speaker, CD/DVD-writer, network adapter, or another device that provides output from the electronic device 100. The input device(s) 140 and output device(s) 150 may be incorporated in a single system or device, such as a touch screen or a virtual reality system.

The communication connection(s) 160 enables communication over a communication medium to another computing entity. Additionally, functionality of the components of the electronic device 100 may be implemented in a single computing machine or in multiple computing machines that are able to communicate over communication connections. Thus, the electronic device 100 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments of the subject matter can be described in the general context of computer-readable media, which may be storage media or communication media. Computer-readable storage media are any available storage media that can be accessed within the electronic device 100, but the term computer-readable storage media does not refer to propagated signals per se. By way of example, and not limitation, with the electronic device 100, computer-readable storage media include memory 120, storage 130, and combinations thereof.

Embodiments of the subject matter can be described in the general context of computer-executable instructions, such as those included in program modules, being executed on a target real or virtual processor in the electronic device 100. Generally, program modules include routines, programs, libraries, objects, classes, components, data structures, or the like that perform particular tasks or implement particular abstract data types. The functionality of the program modules may be combined or split between program modules as desired in various embodiments. Computer-executable instructions for program modules may be executed locally or in a distributed mode. For example, program modules may be located in both local and remote computer storage media.

Figure 2:
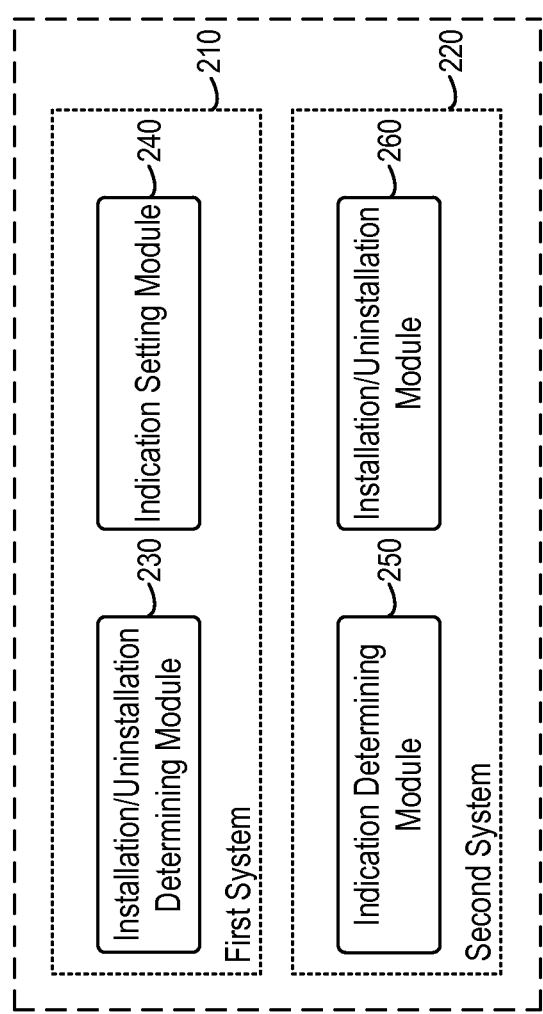
FIG. 2 illustrates an example of the electronic device in accordance with one embodiment of the subject matter described herein.

FIG. 2 illustrates an example of the electronic device 100 in accordance with one embodiment of the subject matter described herein. In the example shown in FIG. 2, the electronic device 100 comprises two different systems, that is, a first system 210 and a second system 220. The first and second systems 210 and 220, which may be implemented by the operating system 170 as described above. In the context of the present disclosure, the first and second system 210 and 220 as described herein may include a real operation system on the electronic device 100, a virtual operation system on a virtual machine that is deployed on the electronic device 100, and a hypervisor of many virtual machines on the electronic device 100. In this example, two systems 210 and 220 are shown on the electronic device 100. It is to be understood that this is only for the purpose of illustration without any suggestion of any limitations on the number of the systems. There may be any suitable number of systems on the electronic device 100.

As shown in FIG. 2, in general, the first system 210 comprises two modules, namely, an installation determining module 230 and an indication setting module 240. In one embodiment, the installation/uninstallation determining module 230 is configured to, responsive to installation or uninstallation of an application on the first system 210 running on the electronic device 100, determine whether the application is to be installed or uninstallation on the second system 220.

As used herein, the term "application" refers to any computer program or software product that can be installed on a physical or virtual machine (such as the electronic device 100) and completes a specific task. Generally, an application is installed on the operating system of the machine, such as the first or second system 210 or 220 of the electronic device 100, by a corresponding installation program.

As used herein, the term "installation" refers to a process of deployment of an application onto an operating system and then execution of the application on the operating system. In one embodiment, the process of installation may comprise registration of the application with the electronic device 100 and the first and second systems 210 and 220, wherein the registration may, for example, be implemented by creating and/or modifying an item of a registry. Alternatively or additionally, the process of installation may also comprise simple downloading or decompressing of documents related to the application into a specified location. As used herein, the term "uninstallation" refers to a process of removal of data related to an installed application.

In the embodiment, if the installation/uninstallation determining module 230 determines that the application is to be installed or uninstalled on the second system 220, the indication setting module 240 may set an indication or a flag for the second system 220 to cause installation or uninstallation of the application on the second system 220. As used herein, the term "indication" or "flag" refers to a status indication to indicate whether or not to install or uninstall the application. An example of the indication includes, but is not limited to, a sequence of one or more bits. For example, the indication may be represented by one bit, wherein "1" indicates that the application is to be installed on or uninstalled from the second system, while "0" indicates that the application is not to be installed on or uninstalled from the second system. This is only for the purpose of illustration without suggestions of any limitations on the scope of the subject matter described herein. The subject matter described herein may be embodied with an indication in any form. Functionalities of the installation/uninstallation determining module 230 and the indication setting module 240 will be detailed below, for example, with reference to FIG. 3.

Still with reference to FIG. 2, in general, the second system 220 comprises two modules: an indication determining module 250 and an installation/uninstallation module 260. In one embodiment, the indication determining module 250 is configured to, responsive to the running of the second system 220, determine whether an indication is set while the first system 210 is running, where the indication indicates that the application is to be installed or uninstalled on the second system 220. As described above, in the case of the installation of the application, the indication may be represented by one bit, with "1" indicating that the application is to be installed or uninstalled, and "0" indicating that the application is not to be installed or uninstalled. In this case, if the indication determining module 250 determines that the indication is set to "1", it is determined that the application is to be installed or uninstalled on the second system 220; if the indication determining module 250 determines that the indication is set to "0", it is determined that the application is not to be installed or uninstalled on the second system 220.

In the embodiment, if it is determined that the application is to be installed or uninstalled on the second system 220, the installation/uninstallation module 260 may initiate the installation or uninstallation of the application on the second system 220. Functionalities of the indication determining module 250 and the installation/uninstallation module 260 will be detailed below, for example, with reference to FIG. 4.

Figure 3:
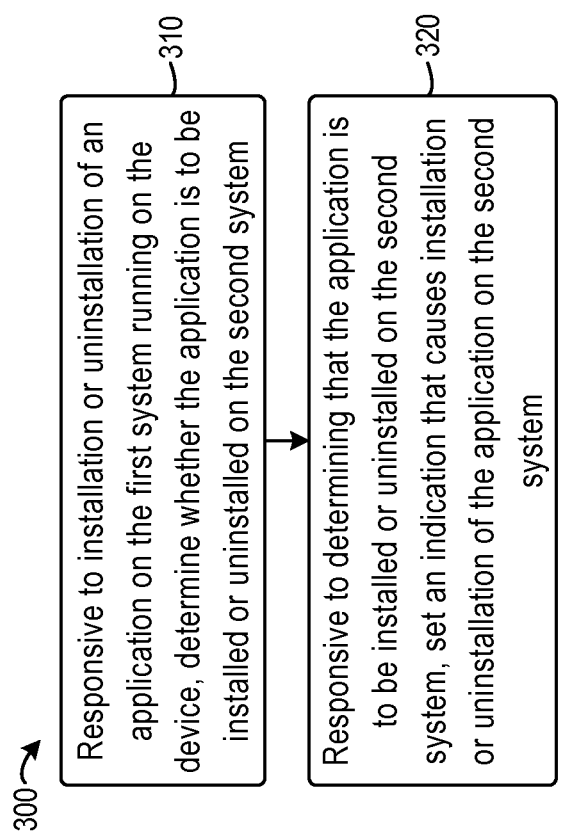
FIG. 3 illustrates a flowchart of a method for the application installation in accordance with one embodiment of the subject matter described herein.

Reference is now made to FIG. 3 which shows a flowchart of a method 300 for the application installation or uninstallation in accordance with one embodiment of the subject matter described herein. The method 300 may be implemented by the first system 210 in the electronic device 100 as described above.

As shown, the method 300 is entered at step 310 where it is determined whether an application is to be installed or uninstalled on the second system 220 when the application is installed or uninstalled on the first system 210 that is running on the electronic device 100.

According to embodiments of the subject matter described herein, the determination may be performed at any time during the installation or uninstallation of the application on the first system 210 and in association with instructions of a user. The instruction may be given by the user initiatively, or responsive to an inquiry from the electronic device 100.

Specifically, for example, in one embodiment, when the user requests to install or uninstall the application on the first system 210, the user may also give the instruction of whether to install or uninstall the application on the second system 220. Alternatively or additionally, in another embodiment, the user may give an instruction responsive to a prompt from the electronic device 100. For example, in one embodiment, when the installation or uninstallation of the application is initiated on the first system 210 responsive to a request of the user, a prompt of whether to install or uninstall the application on the second system 220 may be presented to the user. If the user instructs to install or uninstall the application responsive to the prompt, it may be determined that the application is to be installed or uninstalled on the second system 220.

According to embodiments of the subject matter described herein, the presentation of the prompt may be triggered by any appropriate trigger event during the installation or uninstallation. Alternatively, in one embodiment, the prompt may be presented responsive to the completion of the installation or uninstallation of the application. According to embodiments of the subject matter described herein, the prompt may be implemented in any appropriate form. Examples of the prompt include, but are not limited to, a dialog box, a text, audio or visual message, a vibration, or any suitable combination thereof.

By way of example, it is assumed that the first OS is running on a mobile phone. The user may request to install or uninstall an application, for example, by clicking the icon of the corresponding installation or uninstallation program. Responsive to the request, the installation or uninstallation of the application may be initiated on the first OS. During the installation or uninstallation, a dialog box with options of "yes" or "no" may be presented to the user to inquire whether to install or uninstall the application on the second OS that is also deployed on the mobile phone. If the user selects "yes", it is determined that the application is to be installed or uninstalled on the second OS; otherwise, it is determined that the application is not to be installed or uninstalled.

Still with reference to FIG. 3, if it is determined that the application is to be installed/uninstalled on the second system 220 at step 310, the method 300 then proceeds to step 320, where an indication is set to trigger the installation or uninstallation of the application on the second system 220. In one embodiment, the indication may cause the installation or uninstallation of the application on the second system 220 to be initiated upon the running of the second system 220. That is, the application can be installed or uninstalled on the second system 220 when the second system 220 starts up.

It is to be understood that in alternative embodiments, the installation or uninstallation can be initiated at any other suitable timing. For example, in one embodiment, the application may be installed or uninstalled when the device 100 connects to the network if the installation or uninstallation needs to have network access. As another example, the installation or uninstallation can be initiated when the CPU or memory utilization is below a predetermined level.

It should be appreciated that if it is determined that the application is not to be installed or uninstalled on the second system 220 at step 310, subsequent actions belong to normal actions, and the details thereof will be omitted. As described above, the indication may be represented by a sequence of one or more bits. With the indication, the second system 220 may initiate the installation or uninstallation of the application.

According to embodiments of the subject matter described herein, the indication may be stored in a shared storage area that is accessible to the second system 220. As used herein, the term "the shared storage area" refers to a storage area where the first system 210 can write data and the second system 220 can read data, or both of the first and second systems 210 and 220 can write and read data. The shared storage area may be a storage area at any suitable location that is accessible to the first and second systems 210 and 220. Examples of the shared storage area includes, but are not limited to, a local storage area on the electronic device 100 and a network storage area remotely located from the electronic device 100.

Specifically, in one embodiment, the shared storage area may be a storage area separated from the memory 120 and/or storage 130 of the electronic device 100. An example of such a storage area is a partition of the memory 120 or storage 130, which may be referred as Common User Data Configuration Storage (CUDCS). Alternatively or additionally, the shared storage area may be a combination of a portion of the memory 120 and a portion of the storage 130.

Alternatively or additionally, in another embodiment, the shared storage area may be a storage area located remotely from the electronic device 100. Accordingly, the two systems 210 and 220 may have an access to the storage area over the network. For example, the shared storage area may be a cloud storage area.

According to embodiments of the subject matter described herein, responsive to the indication indicating the installation or uninstallation of the application, the installation or uninstallation process may be initiated on the second system 220 after the system 220 starts up and runs on the electronic device 100. In one embodiment, the installation or uninstallation process may be performed automatically on the second system 220 responsive to the running of the second system 220.

In the context of the present disclosure, the automatic installation includes either full-automatic or semi-automatic installation. As used herein, the term "full-automatic installation" refers to an automatic process of installation without any input from the user. The term "semi-automatic installation" refers to a process of installation where some steps of the installation require instructions or other input from the user. For example, the installation may be automatically initiated, but its subsequent process needs input from the user. For example, in one embodiment, in the case of semi-automatic installation, after the second system 220 starts up on the electronic device 100, the user is inquired whether the application is to be installed on the system 220. Then, the installation is initiated responsive to the instruction of the installation from the user. The procedure of installation will be detailed below, for example, with reference to FIG. 4. Likewise, the uninstallation program may be executed when the second system 200 starts up and asks the user for a confirmation of the uninstallation, for example.

According to embodiments of the subject matter described herein, the mode of the installation or uninstallation, such as automatic or semi-automatic installation/uninstallation, may be indicated by the user and indicated by an indication.

For example, in one embodiment, after the user instructs to install or uninstall the application on the second system 220, a prompt may be presented to the user to ask whether the application is to be automatically installed or uninstalled. The presentation of the prompt may be triggered by any appropriate trigger event during the installation or uninstallation, and the scope of the subject matter described herein will not be limited in this regard. As described above, the prompt may include, but is not limited to, a dialog box, a text, audio or visual message, a vibration, or any suitable combination thereof.

By way of example, it is assumed that the first OS is running on the mobile phone. After the user instructs to install or uninstall the application on the second OS which is also deployed on the mobile phone, a prompt of whether to automatically install the application may be presented to the user. In this example, the prompt may be presented in a form of dialog box. That is, a dialog box with options of "yes" or "no" may be presented to the user to inquire whether to automatically install or uninstall the application on the second OS. If the user selects "yes", the installation or uninstallation of the application will be automatically initiated while the second OS is running.

In implementation, the mode of automatic or semi-automatic installation/uninstallation may be indicated by an indication which can be referred as "mode indication." For example, the mode indication may indicate whether to automatically install the application. The mode indication and the installation/uninstallation indication indicating whether to install or uninstall the application on the second system may be implemented as a single indication. Alternatively, two separate indications can be used. For example, in one embodiment, the installation/uninstallation indication may be reused to indicate the automatic installation or uninstallation. As described above, in one embodiment, the installation/uninstallation indication may be a sequence of one or more bits. In this example, two bits may be used to indicate whether to install or uninstall the application on the second system and the installation/uninstallation mode. By way of example and without suggesting any limitations, in one embodiment, "11" indicates the full-automatic installation/uninstallation, "10" indicates the semi-automatic installation/uninstallation, and "00" indicates disabling of the installation/uninstallation of the application on the second system.

Alternatively or additionally, in another embodiment, in addition of the installation/uninstallation indication, a separate mode indication may be used to indicate whether the application is to be automatically installed on the second system 220. The mode indication may be in a similar way to the installation/uninstallation indication, and the details thereof will be omitted herein.

As described above, the installation/uninstallation indication may be stored in a shared storage area that is accessible to both the systems 210 and 220. According to embodiments of the subject matter described herein, the mode indication may also be stored in a shared storage area. The shared storage area of the mode indication may be embodied in a similar form to that of the installation/uninstallation indication. The shared storage areas of the mode indication and the installation/uninstallation indication may be implemented as a single shared storage area. Alternatively, two separate shared storage areas can be used.

With the determination of the installation or uninstallation of the application on the second system 220 and then the setting of the installation/uninstallation indication by the first system 210, the installation or uninstallation of the application in the computing environment with multiple operating systems may be done more effectively and efficiently. In the conventional approach, a user has to repeat the process of installation many times on different operating systems of a device. Such a procedure is time-and-energy consuming According to embodiments of the subject matter described herein, in the device supportive of multiple operating systems, the installation on one operating system may be determined on another operating system, and the installation on the operating system may be initiated while it is running In this way, the efficiency of application installation and user's experiences may be improved.

Specifically, as discussed above, the uninstallation of the application on the second system 220 may also be controlled on the first system 210. When the user is uninstalling an application from the first system 210, he/she is allowed to set whether the same application is to be uninstalled on the second system 210 in the same device.

The automatic or semi-automatic application uninstallation would be beneficial. It would be appreciated that the uninstallation of an application might mean that the user would not use this application anymore on either the first system or the second system. However, when the user logs on the second system, he/she is likely to forget to uninstall the application from the second system, especially when the user switches to the second system after a relatively long time since the uninstallation of the application from the first system, for example. In this event, the application may be left on the second system without being used at all, which will cause resource waste. According to embodiments of the subject matter described herein, this problem can be avoided.

Alternatively or additionally, according to embodiments of the subject matter described herein, data and/or configuration information related to the application, which is generated upon the installation and/or execution of the application, may be stored in a shared storage area, such that the data and/or information may be shared and/or synchronized among different systems. Likewise, this storage area may be embodied in a similar form to that for the indication of the installation and/or uninstallation, and may be same as or different from that for the indication of the installation and/or uninstallation. According to embodiments of the subject matter described herein, the user may decide whether the data and/or configuration information is shared among the systems or not. The detailed operations are similar to the determination of whether to install the application as described above, and therefore the details will be omitted.

Conventionally, the user operates the same application under different operating systems, respectively. The data and/or information related to the operation under one operating system cannot be accessible to another operating system. According to embodiments of the subject matter described herein, the results of the operation of the application on one operating system may be accessible to another operating system. In this way, the efficiency of the use of the application in the computing environment with multiple operating systems may be further improved.

For example, in one embodiment, it is possible to use the following XML statements to describe the configuration of the installation and/or uninstallation of the application on different systems, which is set while the first system 210 is running according to embodiments of the subject matter described herein.

```
<Application>
    <ApplicationName>app_XXX</ApplicationName>
    <CommonConfigurationPosition>\CUDCS\APP\app_XXX</CommonConfigurationPosition>
    <SupportedOS>
        <OSname>the first OS<\OSname>
        <OSVersion>7, 7.1, 8<\OSVersion>
        <ApplicationName>app_XXX</ApplicationName>
        <ApplicationSource> application store </ApplicationSource>
        <OSattribute> Primary </OSattribute>
        <NeedInstallation> Yes </NeedInstallation>
        <AutomaticInstallation> No </AutomaticInstallation>
        <NeedUninstallation> No </NeedUninstallation>
        <AutomaticUninstallation> Yes </AutomaticUninstallation>
        <Installed> Yes </Installed>
        <CommonUserData> Yes </CommonUserData>
    </SupportedOS>
    <SupportedOS>
        <OSname>the second OS<\OSname>
        <OSVersion>7.5, 8, 8.1<\OSVersion>
        <ApplicationName>app_XXX</ApplicationName>
        <ApplicationSource> Marketplace </ApplicationSource>
        <OSattribute> Subsidiary</OSattribute>
        <NeedInstallation> Yes </NeedInstallation>
        <AutomaticInstallation> Yes </AutomaticInstallation>
        <NeedUninstallation> No </NeedUninstallation>
        <AutomaticUninstallation> No </AutomaticUninstallation>
        <Installed> No </Installed>
        <CommonUserData> Yes </CommonUserData>
    </SupportedOS>
    <SupportedOS>
        <OSname>the third OS<\OSname>
        <OSVersion>7.5, 8, 8.1<\OSVersion>
        <ApplicationName>app_XXX</ApplicationName>
        <ApplicationSource> the second OS Market </ApplicationSource>
        <OSattribute> Subsidiary</OSattribute>
        <NeedInstallation> Yes </NeedInstallation>
        <AutomaticInstallation> No </AutomaticInstallation>
        <NeedUninstallation> No </NeedUninstallation>
        <AutomaticUninstallation> No </AutomaticUninstallation>
        <Installed> No </Installed>
        <CommonUserData> No </CommonUserData>
    </SupportedOS>
</Application>
```

In this example, as indicated by the field "CommonConfigurationPosition", CUDCS is the storage area shared among different systems. The first OS acts as the primary system that is running on the mobile phone, and the second OS and the third OS act as the subsidiary systems that are stand-by. Regarding the first OS, the field "Installed" set to "Yes" indicates that the application has been installed on the first OS, and the field "CommonUserData" set to "Yes" indicates that the related data and/or information may be shared by other systems. Regarding the second OS, the field "NeedInstallation" set to "Yes" and the field "AutomaticInstallation" set to "Yes" indicate that the application will be automatically installed on the second OS responsive to its running; and "CommonUserData" set to "Yes" indicates that the related data and/or information may be shared by other systems. Regarding the third OS, the field "NeedUninstallation" set to "Yes" and the field "AutomaticUninstallation" set to "Yes" indicate that the application will be automatically uninstalled on the third OS responsive to its running; and the field of "CommonUserData" set to "No" indicates that the related data and/or information may not be shared by other systems.

Figure 4:
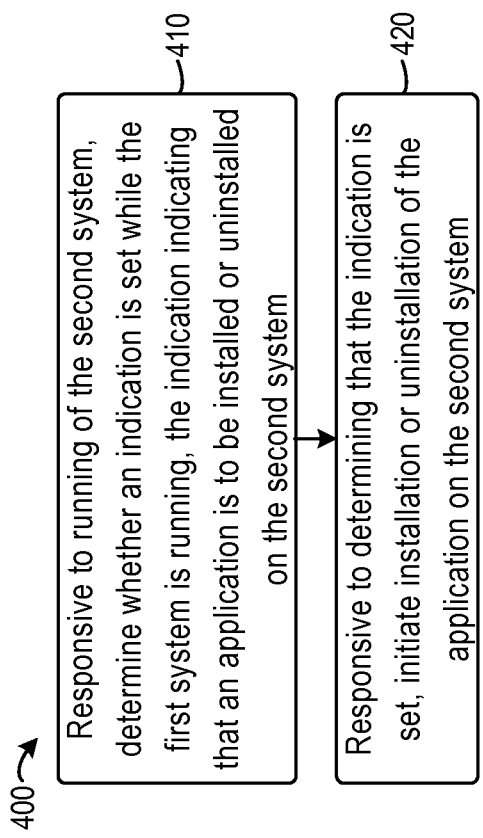
FIG. 4 illustrates a flowchart of a method for the application installation in accordance with one embodiment of the subject matter described herein.

FIG. 4 shows a flowchart of a method 400 for the application installation or uninstallation according to one embodiment of the subject matter described herein. The method 400 may be implemented by the second system 220 in the electronic device 100 as described above.

As shown, the method 400 is entered at step 410 where it is determined whether an indication is set while the first system 210 is running, wherein the indication indicates that an application is to be installed or uninstallation on the second system 220 responsive the running of the second system 220.

As described above, the indication may be set at any time during the installation or uninstallation of the application on the first system 210 and in association with instructions of a user. Furthermore, the indication may be represented by a sequence of one or more bits. For example, the indication may be represented by one bit, with "1" indicating the installation or uninstallation of the application and "0" indicating the non-installation/non-uninstallation of the application.

As described above, the indication may be stored in a shared storage area that is accessible to both of the first and second systems 210 and 220. Accordingly, in one embodiment, the determination of the indication at step 410 may comprise retrieving the indication from the shared storage area. As described above, the shared storage area refers to a storage area where the first system 210 can write data and the second system 220 can read data, or both of the first and second systems 210 and 220 can write and read data.

Specifically, as described above, the shared storage area may include a local storage area on the electronic device 100, such as CUDCS, and a network storage area remotely located from the electronic device 100, such as a cloud storage area. For example, in one embodiment, the shared storage area is a local storage area on the electronic device 100 and the second system 220 may directly retrieve the indication from the storage area. Alternatively or additionally, in another embodiment, the shared storage area is a network storage area remotely located from the electronic device 100 and the second system 220 may access the storage area and retrieve the indication over the network.

Still with reference to FIG. 4, if the indication indicating the installation or uninstallation is determined at step 410, the method 400 then proceeds to step 420, where the installation or uninstallation of the application is initiated. It should be appreciated that if the indication is not determined at step 410, subsequent actions belong to normal actions, and the details thereof will be omitted herein.

As described above, the installation or uninstallation may include full-automatic or semi-automatic installation/uninstallation. As described above, the mode of the installation/uninstallation, such as automatic or semi-automatic installation/uninstallation, may be indicated by a mode indication which is set under the first system 210. The mode indication and the installation/uninstallation indication indicating whether to install or uninstall the application on the second system may be implemented as a single indication. Alternatively, two separate indications can be used. Then, the installation is performed based on the determination of the installation/uninstallation indication and the mode indication.

Specifically, in one embodiment, if the mode indication indicates a full-automatic installation/uninstallation, the whole process of the installation or uninstallation will be full-automatically performed while the second system 220 is running. For example, in the case of full-automatic installation, the installation program may be automatically downloaded, and the application may be automatically installed using the downloaded installation program. Alternatively or additionally, in the case of full-automatic uninstallation, the application may be automatically uninstalled from the second system, and the installation program may be automatically deleted.

Alternatively or additionally, in another embodiment, if the indication indicates a semi-automatic installation/uninstallation, the installation or uninstallation will be completed in association with user's instructions. For example, in one embodiment, the process of the installation or uninstallation is automatically initiated while the second system 220 is running, and every specific action related to the installation or uninstallation is taken responsive to a further instruction from the user.

According to embodiments of the subject matter described herein, the user may give instructions initiatively, or responsive to an inquiry from the electronic device 100. Specifically, for example, in one embodiment, after the installation or uninstallation of the application is initiated, the user may give one-time instructions related to the installation or uninstallation. By way of example and without suggesting any limitations, in the case of installation of the application, the instructions may indicate where to download the installation program, where to store the installation program, where to store the installed application, and the like. Alternatively or additionally, in another embodiment, the user may give instructions responsive to a prompt from the electronic device 100. For example, a prompt corresponding to a specific action may be presented to the user, such as where to download the installation program, where to store the installation program, where to store the installed application, and the like. Then, the user made a instruction responsive to the prompt. The implementation of the prompt is similar to the prompt as described above with reference to FIG. 3, and the details thereof will be omitted herein.

By way of example, it is assumed that the second OS starts up and runs on the mobile phone responsive to the user's request for switching from the first OS to the second OS. If the installation/uninstallation indication is determined, which is set to indicate the installation or uninstallation of an application on the second OS while the first OS is running, the installation or uninstallation of the application is initiated while the second OS is running Upon the initiation, the mode indication is determined, which is also set to indicate the automatic installation or uninstallation of the application while the first OS is running. Responsive to the mode indication being determined, the application is automatically installed or uninstalled on the second OS. During the automatic installation or uninstallation, a prompt related to a specific action may be sent to the user. In the case of the installation of the application, the prompt may inquire, for example, where to store the installed application, where to download the installation program, where to store the installation program, where to store the installed application, and the like. In this example, the user may also be inquired to select which version of the same application the user wants to install or uninstall. For example if there are more than one application versions available for the same application which was installed or uninstalled in the first system 210, a prompt of which version of the application to be installed or uninstalled on the second system 220 may be presented to the user.

In the conventional approach, in the electronic device supportive of multiple operating systems, after the user has requested to install or uninstall an application on one operating system, the user has to repeat the whole process of installation or uninstallation on another operating system. Such a procedure is time-and-energy consuming According to embodiments of the subject matter described herein, the installation or uninstallation of the application on one operating system may be performed based on the related configuration by another operating system. In this way, the installation or uninstallation of the application in the computing environment with multiple operating systems is more effective and efficient.

As described above, the automatic or semi-automatic application uninstallation would be beneficial. If the user would not use an application anymore on the first system, he/she is likely to forget to uninstall the application from the second system when he/she logs on the second system. In this event, the left of the application on the second system will cause resource waste. According to embodiments of the subject matter described herein, this problem can be avoided.

When the application is installed on the second system, the installation may fail due to the insufficiency of available resources. In one embodiment, in the case of full-automatic and semi-automatic installations, the initiation of the installation may comprise determining whether the resources available to the second system 220 are sufficient for the installation of the application on the second system 220. If the available resources are not sufficient, the process of the installation will be terminated. In this way, the probability of successful installation may be improved.

Specifically, in one embodiment, it is possible to estimate the amount of resources that will be consumed by the installation and/or the execution of the application. If the available amount of resources on the second system 220 is less than the estimated amount, or the estimated amount exceeds a predefined threshold, then the installation of the application can be terminated. Alternatively, a prompt may be presented to the user so that the user can release some resources to continue the installation, if desired.

Examples of resources includes, but are not limited to, one or more of the following: computing resources, such as the type, number and frequency of available central processing units (CPUs); storage resources, such as the type, number and size of available memories and disks; input/output (I/O) resources, such as the type, number and graphics acceleration capabilities of available graphics processing units (GPUs); network resources, such as the supported network communication type and available bandwidth.

According to embodiments of the subject matter described herein, various appropriate methods for estimating the amount of one or more resources used upon the installation of the application. For example, in one embodiment, knowledge of resource usage related to various types of applications may be known in advance. In this embodiment, the expected amount of various types of used resources in the case of the installation may be estimated based on the knowledge and the type of the application.

Alternatively, in another embodiment, the amount of resources to be used by the application to be installed may be known to the installation program, and therefore the installation program may notify it to the electronic device 100. For example, the installation manual of the application to be installed may indicate the lowest and/or optimal amount of resources required by the application. Specifically, for example, the installation manual may specify that the execution of the application requires at least the spare storage space of 100 M and the CPU main frequency of 1 GHz. In this case, the specified amount of resources may be considered as the expected amount of resource usage. As another example, the expected amount of resource usage may be inputted by the user during the installation. Any other approaches are possible, and the scope of the subject matter described above will not be limited in this regard.

As described above, according to embodiments of the subject matter described herein, in order to further improve the efficiency of the use of the application in the multiple operating system environment, data and/or configuration information related to the application, which is generated upon the installation and/or execution of the application, may be stored in a shared storage area, such that the data and/or information may be shared and/or synchronized among different systems. Accordingly, in one embodiment, the method 400 may comprise obtaining data related to the application, which is provided by the first system 210, from a shared storage area such that the data is available to the application on the second system 220. Alternatively or additionally, in another embodiment, the method 400 may also comprising obtaining configuration information related to the application, which is provided by the first system 210, from a shared storage area, and configuring the application on the second system 220 with the obtained configuration information.

It should be appreciated that the shared storage area for the data and/or configuration information related to the application may be embodied in a similar form to that for the indication of the installation and/or uninstallation, and may be same as or different from that for the indication of the installation and/or uninstallation.

By way of example, as shown in the XML statements described with reference to FIG. 3, after the second OS starts up and runs on the electronic device 100, responsive to the field "NeedInstallation" set to "Yes" and the field "AutomaticInstallation" set to "Yes", the application is automatically installed on the second OS responsive to its running. After the third OS starts up and runs on the electronic device 100, responsive to the field "NeedUninstallation" set to "Yes" and the field "AutomaticUninstallation" set to "Yes", the application is automatically uninstalled on the third OS responsive to its running.

The functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method implemented by a device having at least a first system and a second system, the second system being different from the first system, the method comprising:
responsive to installation of an application on the first system running on the device, determining whether the application is to be installed on the second system, or, responsive to uninstallation of an application on the first system running on the device, determining whether the application is to be uninstalled on the second system;
setting an indication responsive to installation of the application on the first system and determining that the application is to be installed on the second system, the indication causing installation of the application on the second system, or, setting an indication responsive to uninstallation of the application on the first system and determining that the application is to be uninstalled on the second system, the indication causing uninstallation of the application on the second system; and
responsive to installation of the application on the first system and the second system, registering the application on both the first system and the second system, or, responsive to uninstallation of the application on the first system and the second system, de-registering the application on both the first system and the second system.

2. The method according to claim 1, wherein the indication causes the installation or uninstallation of the application on the second system to be initiated upon running of the second system.

3. The method according to claim 1, wherein setting the indication comprises:
storing the indication in a shared storage area accessible to the second system.

4. The method according to claim 1, further comprising:
storing at least one of data and configuration information related to the application in a shared storage area accessible to the second system.

5. The method according to claim 3, wherein the shared storage area includes at least one of a local storage area on the device and a network storage area located remotely from the device.

6. The method according to claim 1, further comprising:
setting a further indication to indicate whether the application is to be automatically installed or uninstalled on the second system.

7. A method implemented by a device having at least a first system and a second system, the second system being different from the first system, the method comprising:
responsive to running of the second system, determining whether an indication is set while the first system is running, the indication indicating that an application is to be installed or uninstalled on the second system, the indication indicating at least whether the application is to be installed or uninstalled automatically or semi-automatically; and
responsive to determining that the indication is set, initiating installation or uninstallation of the application on the second system; and
responsive to installation of the application on the second system, registering the application on the second system such that the application is registered on both the first system and the second system simultaneously, or, responsive to uninstallation of the application on the second system, de-registering the application on the second system such that the application is not registered on either the first system or the second system.

8. The method according to claim 7, wherein determining whether the indication is set comprises:
retrieving the indication from a shared storage area.

9. The method according to claim 7, further comprising:
obtaining data related to the application from a shared storage area such that the data is available to the application on the second system, the data provided by the first system.

10. The method according to claim 7, further comprising:
obtaining configuration information related to the application from a shared storage area, the configuration information provided by the first system; and
configuring the application on the second system with the obtained configuration information.

11. The method according to claim 8, wherein the shared storage area includes at least one of a local storage area on the device and a network storage area located remotely from the device.

12. The method according to claim 7, wherein initiating the installation or uninstallation of the application on the second system comprises:
determining whether a further indication is set while the first system is miming, the further indication indicating that the application is to be automatically installed or uninstalled on the second system; and
responsive to determining that the further indication is set, automatically installing or uninstalling the application on the second system.

13. The method according to claim 12, wherein automatically installing the application on the second system comprises:
determining whether resources available to the second system are sufficient for the installation of the application on the second system; and
responsive to determining that the resources are insufficient, terminating the installation of the application on the second system.

14. A device comprising:
a processor; and
a memory including computer-executable instructions which, upon execution by the processor, cause the processor to:
responsive to installation or uninstallation of an application on the first system, determine whether the application is to be installed or uninstalled on a second system, the second system being different from the first system as a first system runs on the device, and
set an indication responsive to determining that the application is to be installed or uninstalled on the second system, the indication causing installation or uninstallation of the application on the second system in either an automatic or semi-automatic mode as a first system runs on the device; and
determine whether the indication is set as the first system runs on the device, the indication indicating that the application is to be installed or uninstalled on the second system as the second system runs on the device, and
responsive to determining that the indication is set indicating that the application is to be installed, initiate the installation of the application on the second system, or, responsive to determining that the indication is set indicating that the application is to be uninstalled, initiate the uninstallation of the application on the second system as the second system runs on the device; and
responsive to installation of the application on the second system, registering the application on the second system such that the application is registered on both the first system and the second system simultaneously, or, responsive to uninstallation of the application on the second system, de-registering the application on the second system such that the application is not registered on either the first system or the second system.

15. The device according to claim 14, wherein the indication causes the installation or uninstallation of the application on the second system to be initiated upon running of the second system.

16. The device according to claim 14, wherein the instructions, upon execution by the processor, cause the processor to:
store the indication in a shared storage area as the first system runs on the device; and
retrieve the indication from the shared storage area as the second system runs on the device.

17. The device according to claim 14, wherein the instructions, upon execution by the processor, cause the processor to:
store data related to the application in a shared storage area as the first system runs on the device; and
obtain the data related to the application from the shared storage area as the second system runs on the device, such that the data is available to the application on the second system.

18. The device according to claim 14, wherein the instructions, upon execution by the processor, cause the processor to:
store configuration information related to the application in a shared storage area as the first system runs on the device;
obtain the configuration information related to the application from the shared storage area as the second system runs on the device; and
configure the application on the second system with the obtained configuration information as the second system runs on the device.

19. The device according to claim 14, wherein the instructions, upon execution by the processor, cause the processor to:
set a further indication to indicate whether the application is to be automatically installed or uninstalled on the second system as the first system runs on the device;
determine, in response to the second system running on the device, whether the further indication is set, the further indication indicating that the application is to be automatically installed or uninstalled on the second system; and
responsive to determining that the further indication is set, automatically install or uninstall the application on the second system as the second system runs on the device.

20. The device according to claim 19, wherein the instructions, upon execution by the processor, cause the processor to:
determine whether resources available to the second system are sufficient for the installation of the application on the second system as the second system runs on the device; and
responsive to determining that the resources are insufficient, terminate the installation of the application on the second system.

* * * * *